United States Patent
Handa (10) Patent No.: US 7,637,292 B2
(45) Date of Patent: Dec. 29, 2009

(54) PRESSURE POWERED COOLING SYSTEM FOR ENHANCING THE REFILL SPEED AND CAPACITY OF ON BOARD HIGH PRESSURE VEHICLE GAS STORAGE TANKS

(75) Inventor: Kiyoshi Handa, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 685 days.

(21) Appl. No.: 11/380,429

(22) Filed: Apr. 27, 2006

(65) Prior Publication Data

US 2007/0000561 A1 Jan. 4, 2007

Related U.S. Application Data

(60) Provisional application No. 60/679,032, filed on May 9, 2005.

(51) Int. Cl.
*B65B 1/04* (2006.01)

(52) U.S. Cl. ........................................................ 141/82

(58) Field of Classification Search .................... 141/82, 141/2, 18, 98, 286, 67; 123/525; 62/50.1–50.5; 137/255, 263; 272/146.1, 146.6
See application file for complete search history.

(56) References Cited

U.S. PATENT DOCUMENTS 7,377,294 B2 * 5/2008 Handa .......................... 141/82

* cited by examiner

*Primary Examiner*—Steven O Douglas
(74) *Attorney, Agent, or Firm*—Mark F. Duell; Porter Wright Morris & Arthur LLP

(57) ABSTRACT

Apparatus wherein the compression heat of refueling of an on board vehicle tank is evacuated from the interior of the on board tank by a heat absorber within the tank through a radiator external to the tank and in which a coolant circulating from the heat absorber within the tank to the external radiator [and/or an associated blower system] is powered by the mechanical energy of the refueling gas as the gas traverses a turbine from the high pressure refuel depot to the low pressure on board tank. The turbine powers the gas cooling system.

18 Claims, 10 Drawing Sheets

PRESSURE POWERED COOLING SYSTEM FOR ENHANCING THE REFILL SPEED AND CAPACITY OF ON BOARD HIGH PRESSURE VEHICLE GAS STORAGE TANKS

RELATED APPLICATIONS

This application is related to and claims all benefits under 35 U.S.C. § 119(e) of my earlier U.S. Provisional Patent Application Ser. No. 60/679,032 filed on May 9, 2005, entitled "Gas Cooling Methods for High Pressure Storage Cylinder Fuel Tanks on Vehicles Powered by Compressed Natural Gas or Hydrogen."

FIELD OF THE INVENTION

The present invention relates to a system for efficiently refueling high pressure, on board, vehicle gas fuel tanks for hydrogen gas and compressed natural gas at a refueling station where high capacity, high pressure fuel storage tanks provide the fuel to the vehicle through a consumer dispensing means.

BACKGROUND OF THE INVENTION

When high pressure gases, such as hydrogen ("$H_2$") and compressed natural gas (CNG) are used as fuels in motor vehicles, a fuel depot infrastructure for efficient consumer refueling of the vehicles must also be developed. Typically, in the use of hydrogen gas to power fuel cells, or in the use of compressed natural gas, to power internal combustion engines in motor vehicles, present practice is that high pressure fuel is stored is dispensed to and stored in on board fuel tanks maintained at a maximum design pressure in the range of about 5000 psi for hydrogen and about 3600 psi for CNG. Higher pressures in the range of about 10,000 psi are likely to be utilized as a result of consumer preference for longer vehicle range after a refill, and as the art progresses. In the instance of a fuel cell powered vehicle, utilization of the hydrogen input into the fuel cell stack occurs at about 30 psi. An increase in the energy efficiency of the overall system of fuel depots and vehicle tanks and refueling systems and their interrelationships is a desired goal.

Hydrogen powered vehicles use high pressure hydrogen storage tanks to store hydrogen on board to power vehicle fuel cell stacks. Herein, reference to high pressure hydrogen powered fuel cell vehicles also correlates the use of the invention with high pressure compressed natural gas powered vehicles. [When the term "hydrogen" is used in the specification, "hydrogen" is a term intended to be interchangeable with CNG in the high pressure environment discussed herein. Namely, both hydrogen and CNG are high pressure gases with which the invention is useful.]

In consumer vehicles, the use of multiple cylindrically shaped small fuel tanks rather than one large tank is preferred for design purposes. Various designs for high pressure hydrogen refueling stations have been proposed to deal with refueling efficiencies. When the on board fuel tanks of a hydrogen powered vehicle are filled with hydrogen, the pressurized on board gas in the tanks may be characterized as having multiple forms of energy: 1) chemical energy associated with the hydrogen fuel itself (consumed in powering the vehicle), and 2) thermodynamic energy, namely, mechanical and thermal energy associated with the physics of high pressure refueling of the on board tank from sources of fuel at the high pressure gas refuel depot.

Hydrogen and CNG fueled vehicles have high pressure on board fuel gas storage tanks. During a high pressure refueling process, the interiors of the on board tanks become heated as a result of fuel gas compression as the tank pressure increases and other refueling parameters affect the refill. After refueling, the interior temperature of the tank and the pressure within the tank both decrease slowly as the fuel gas is consumed during vehicle operation. Conventionally, it is not possible to obtain a full refill tank pressure without pressure compensation during the course of refueling. The charge of fuel pressure input into and stored in the tank must be, at refill (because of the heating compression of the gas), initially in excess of the tank design pressure. Without pressure compensation (an initial overfill), vehicle mileage range is reduced because a full fill is not obtained. When higher optimum tank design pressures are encountered, this condition is exacerbated. In one response to the overfill dilemma, a slower flow rate may be used during refill, which will result in a lower internal tank temperature, and higher pressure, and increased capacity over time. An undesirable consequence of a slower flow rate during refueling to avoid heat build up is self evident—a longer refueling time. Another solution proposes to cool the station fuel gas before refueling; cooling, however, requires substantial energy, thereby reducing the overall efficiency of a hydrogen/CNG economy. Pre-cooling or other pre treatment of the high pressure refuel gas is generally unnecessary when fill pressures are at 5000 psi or lower, however, as pressures approach or exceed 10,000 psi, cooling (and its opposite, internal tank heating by compression) becomes an important factor in the refueling process. A pressure overfill as an option likewise requires additional energy expense where additional gas compression is involved and further increases the heat generated in the tank as a result of high pressure compression during the refill process. In any case, secondary treatment of the refill gas is generally unnecessary when tank fill pressures are at 5000 psi or lower. As tank pressures exceed 3600 psi (for CNG) and 5000 psi and approach or exceed 10,000 psi (for hydrogen), secondary treatment such as cooling becomes an important factor in the refueling process to achieve a full tank capacity fill. When a full fill is achieved, 1) overall vehicle range per each tank refill thereby increases, 2) energy required for a refill (such as for precooling or a pressure overfill) is reduced, 3) time is saved, and 4) overall customer satisfaction increases.

OBJECTS OF THE INVENTION

It is an object of the present invention to minimize energy loss and increase refueling efficiency in hydrogen refilling systems when factored into the overall energy efficiency of an infrastructure of high pressure gas powered vehicles and fuel depots for the consumer dispensation of high pressure fuel. Typically, each time a vehicle is refueled with hydrogen, mechanical compression transforms into thermal energy and results in the heating of refueled gas in the tank, hence, it is an object of the invention to minimize tank heating and to increase the efficiency and refueling capacity of an on board fuel storage tank in a hydrogen powered motor vehicle. It is an object of the invention to minimize high pressure gas tank heating and to increase the efficiency and refueling capacity of an on board fuel storage tank in high pressure gas powered motor vehicles. It is an object of the invention to provide a system that can remove the compression heat resulting from refueling an on board tank during high pressure refueling. An avoidance of secondary gas cooling pretreatment and/or pressure overfill, a speedier refueling time, increased refueling efficiency, and an extension of overall vehicle range will result. Improved tank capacity per unit volume is achieved during refilling, particularly where nominal refill pressure is in the range of about 10,000 psi or greater for hydrogen and about 3,600 psi for CNG.

SUMMARY OF THE INVENTION

The invention provides a system that can remove the heat of compression resulting from the high pressure refueling of an on board vehicle tank. Refueling time will decrease and refueling efficiency and overall vehicle range will increase as a result of the improved tank capacity per unit volume achieved by the tank gas cooling system described herein. In accordance with the present invention, effective reduction of fuel tank heating during the refueling process is provided by systems for heat evacuation in which a tank interior heat absorber is interconnected with an external heat radiator, thereby collecting interior tank heat and radiating the absorbed heat into the ambient atmosphere or other system appropriate for the use, radiation, absorption, or disposal of the collected heat of high pressure refueling. At high pressure at a hydrogen or compressed natural gas vehicle refuel depot, the thermal energy (heat) generated by from the high flow rate of the high pressure refueling gas is evacuated from the on board fuel tank[s] of consumer vehicle on board storage tanks eliminating the need for refueling pre treatments such as a slow fill, secondary precooling, and pressure overfill otherwise used to achieve a full vehicle tank refill. In an example, a high pressure fuel depot refilling line is operatively interconnected to an on board vehicle tank having a gas flow circuit wherein the refuel gas itself is circulated within the on board tank, encompassing a portion of a closed circuit, to absorb the compression heat of refueling. The heat of refueling is then transferred to an external radiator where the gas is cooled before being released into the tank.

The invention provides a system that can remove the compression heat resulting from refueling an on board tank during high pressure refueling, particularly when nominal refill pressure is in the optimum design range of 10,000 psi or 3600 psi or greater. Reduction of fuel tank heating during the refueling process is effected by a heat evacuation system in which an interior tank heat absorber is interconnected with an external heat radiator; the interior absorber collects tank heat resulting from high pressure compression and radiates the absorbed heat into the ambient atmosphere or other vehicle system appropriate for the disposal of collected heat. The mechanical flow energy of the refuel gas powers a means for circulating the high pressure refueling gas from the consumer pump at the refill depot in a circuit from within the tank interior to an external radiator where collected heat associated with the refueling process is radiated to or absorbed by the external environment before the refueling gas enters the tank. In this manner; the intrinsic energy from the high flow rate of the high pressure, refueling gas is utilized to power the heat evacuation system. Time and energy consuming techniques such as a slow fill, secondary precooling, and pressure overfill are not necessary. In brief, the invention provides a system for reducing the energy and for reducing the time required to refill on board tanks on a vehicle from a high pressure fuel depot refilling line operatively interconnected to the tank wherein coolant is circulated within the on board tank to absorb the compression heat of refueling, and the heat thereby absorbed, is radiated from the cooling circuit to an external environment before the fuel reaches the tank such that a close to optimum refill of the tank is achieved. The mechanical energy of the high pressure fuel line interconnected to the vehicle tank is utilized within a flow circuit in the vehicle refueling system, through a turbine, that powers either 1) an electrical generator operatively interconnected to a blower, or coolant, or air circulation system, or other heat radiator means; or 2) a coolant or air circulation system or other heat radiator means directly mechanically interconnected to the turbine; or 3) both.

The invention is described more fully in the following description of the preferred embodiment considered in view of the drawings in which:

DETAILED DESCRIPTION OF THE INVENTION

The system of the invention increases the refueling energy efficiency of hydrogen powered vehicles by withdrawing the heat of refilling compression from the high pressure gas introduced into on board tanks and by eliminating the need for a slow fill, a pressure overfill and/or refueling station precooling of the gas. Less energy is required to completely refill on board vehicle tanks at a refueling depot. The invention reduces the energy required to recharge the on board vehicle tanks with high pressure gas at the station to return the tanks to a full optimal state in the process of refueling. In one facet of the invention, the mechanical high pressure energy of the refueling gas—as it passes in the refueling line to the relatively "low" pressure of an empty tank—is used to power, or generate power, for a coolant circulation system, a cooling blower system, or both, that evacuate the compression heat of refueling from the tank.

As a result, overall high pressure gas infrastructure energy requirements for motor vehicles are reduced, vehicle mileage range is increased, reducing the need for short interval refills, and consumer satisfaction is enhanced. 1) energy and 2) time required to refill on board tanks on a vehicle from a high pressure fuel depot refilling line is reduced. In brief, in one example described herein, a cooling circuit coil is disposed within the on board tank and is operatively interconnected with the refuel gas inlet interconnected with a turbine or generator or both wherein the high pressure refuel gas itself powers a cooling circuit in the on board tank that absorbs the compression heat of refueling from within the tank interior as the gas compresses from a low pressure signifying an empty status to a high pressure signifying a full status. The compression heat of high pressure refill is thereby absorbed and radiated from the cooling/refueling circuit to an external environment such that a close to optimum refill of the tank is achieved without a slow fill, precooling or pressure overfill—using the mechanical power of the high pressure refill gas itself.

In general, in the invention, a vehicle having one or more than one on board tank[s] for the storage of a gas fuel under high pressure is operatively interconnected through a refill line to the one or more tanks of a high pressure fuel depot. Intermediate the vehicle tank and the refuel depot line, a turbine or other means to convert the high pressure gas flow in the line into mechanical energy is operatively disposed. Heat absorbing means comprising a coolant circuit within the one or more tank captures the heat of refueling resulting from gas compression when the one or more tank is operatively interconnected to a high pressure fuel depot refilling line. The captured heat is transferred to a device for radiating the heat to an environment external to the one or more tank.

In an example, the invention is a vehicle having one or more than one on board tank for the storage of a gas fuel under high pressure and means for operatively interconnecting the one or more tank to a high pressure fuel depot refilling line. Before the high pressure refill line reaches the tank[s], however, the high pressure line passes through a turbine that uses the mechanical energy of the high pressure gas to power either or both of an electrical generator or a pump or a fan. In the example, the refill gas passes into the tank and within the tank there is provided a heat absorbing means for capturing the heat of refueling resulting from gas compression when the one or more tank is operatively interconnected to the high pressure refilling line. The turbine powers a means for transferring the heat captured to an exothermic device for radiating the captured heat to an environment external to the tank[s]. The heat capture means may include a heat sink within the tank connected to a radiator by 1) a highly conductive aluminum or copper, or alloy of either, heat conduit or 2) heat pipe. The heat sink in the tank interior may be configured similarly to correspondingly match the thermal characteristics of the radiator device exterior to the tank; in the former instance the heat sink absorbs heat, in the latter instance, the radiator device radiates heat. The heat sink and or radiator may include fins, pins, plates, wave shaped radiators, mesh, corrugation like elements, or other like devices having high thermal conductivity and high surface area per unit volume or weight, allowing for the maximum thermal efficiency with regard to heat absorbed and heat radiated. The heat sink and radiator are each operatively disposed with regard to a fluid conduit system for the transfer of captured heat. Entropic flow of energy is from hot (within the tank) to cool (the radiator outside). The fluid flow in the conduit system that is encompassed by the heat sink or radiator, in an example, is in a continuous fluid loop, from the hot tank interior where the fluid captures heat—to the radiator where conduit fluid is cooled—returning to the tank interior to begin the heat absorption/heat radiation cycle anew.

In a typical environment for use with a motor vehicle, the fluid material in the conduit fluid flow circuit may typically comprise Freon®, water, a mixture of distilled water and organic fluids such as acetone, methanol, ethanol, toluene, automobile coolant fluids and the like, or their equivalents. Typically, the hollow tube of the conduit circuit is formed from thermally conductive material such as Al, Cu, SUS, etc., In the examples herein, operation of the conduit flow circuit and/or the fan or the blower is evidently dependent on factors such as radiator capacity, rate of heat transfer to the heat sink and the radiator, temperature of heat transferred, fan or blower (cubic feet per minute (cfm)) capacity effective at the radiator, temperature of the ambient external environment, and the like. A control system for the fan and or pump may be configured to interrelate the foregoing factors and determine appropriate fan and or pump speed, on and off timing, and the like.

Figure 1A:
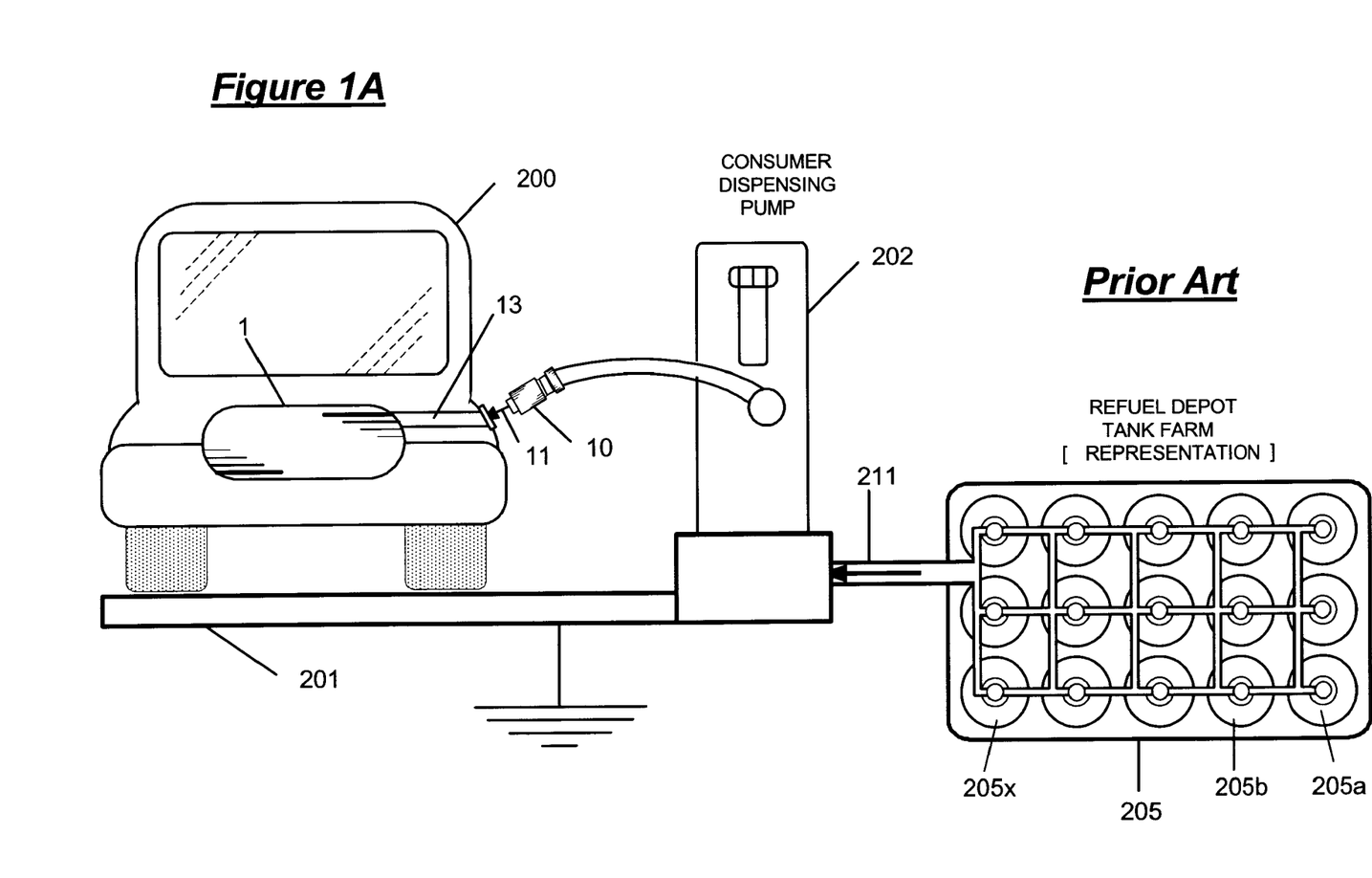
FIG. 1A is a representational diagram of a refueling depot or station showing the relationship of the vehicle with a vehicle tank being refilled through a consumer pump or meter interconnected to station fuel storage apparatus.

FIG. 1A is a representational diagram of a refueling depot or station showing the relationship of the vehicle with a tank being refilled and other station apparatus. FIG. 1A illustrates an example of a prior art high pressure storage tank system for hydrogen or compressed natural gas motor vehicles. A vehicle 200 is positioned on a pad 201 at the station and includes one or more than one on board tank 1 in series with refuel line 13 connectable to station refill nozzle 10 allowing the flow of hydrogen 11 into the tank. The station refueling nozzle 10 is interconnected to station pump 202 which in turn is interconnected to the refuel depot tank farm 205 (with tanks 205a, 205b . . . 205x) through conduits allowing the flow of gas 211 from the station tanks through the pump or meter 202 to the vehicle tank 1. Refuel depot tank switching systems are not part of the present invention. Typically at the station, the consumer vehicle and the station dispensing pump are grounded to prevent the build up of static electricity. The station refueling system, per se, is not specifically involved in the invention described herein, except as fuel dispensation from the station is affected by the increased efficiencies achieved by vehicles using the systems described herein.

Figure 1B:
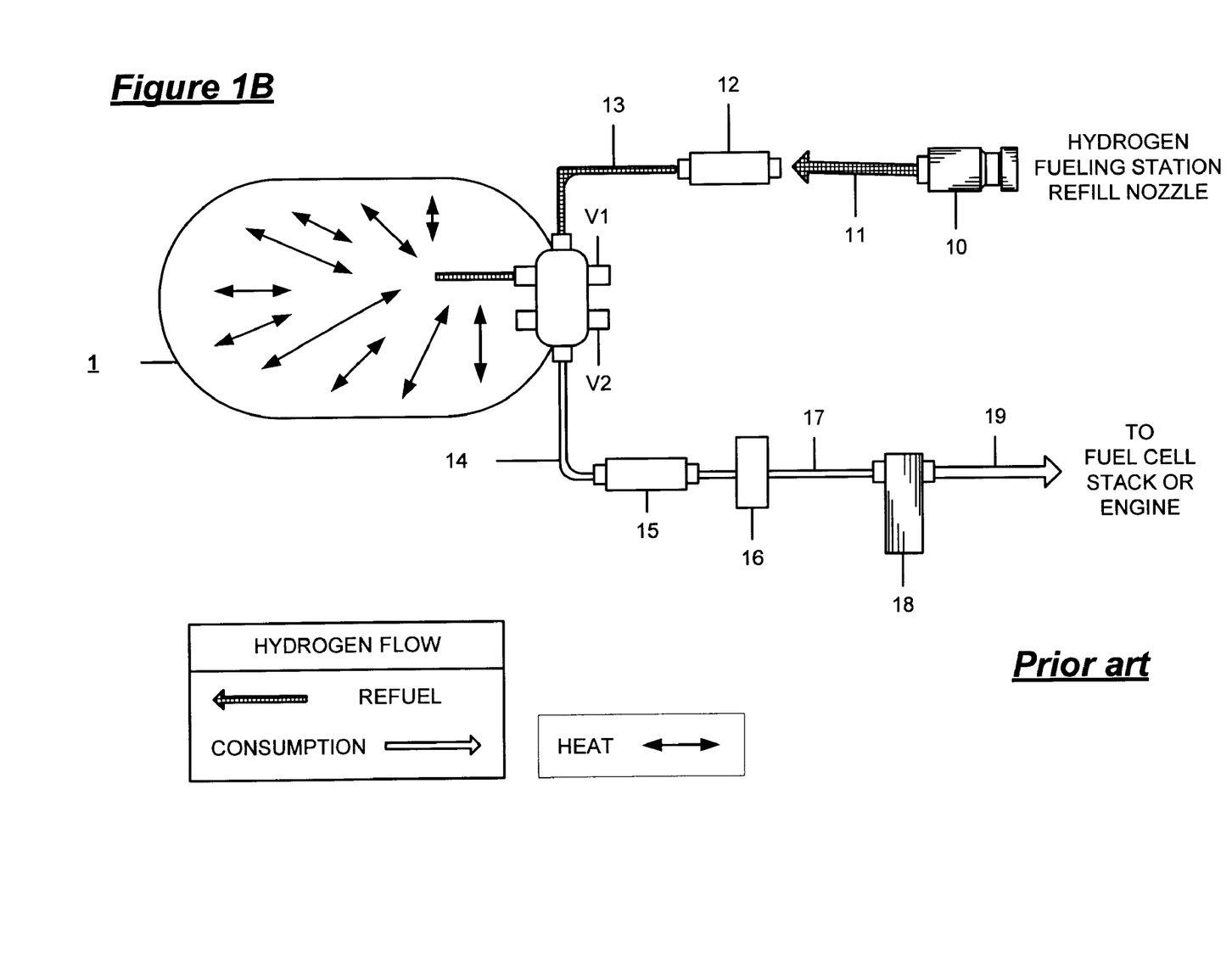
FIG. 1B is a schematic diagram showing heat radiation and build up in a vehicle fuel tank in a prior art pressurized hydrogen or CNG refueling system used in a vehicle.
Figure 1C:
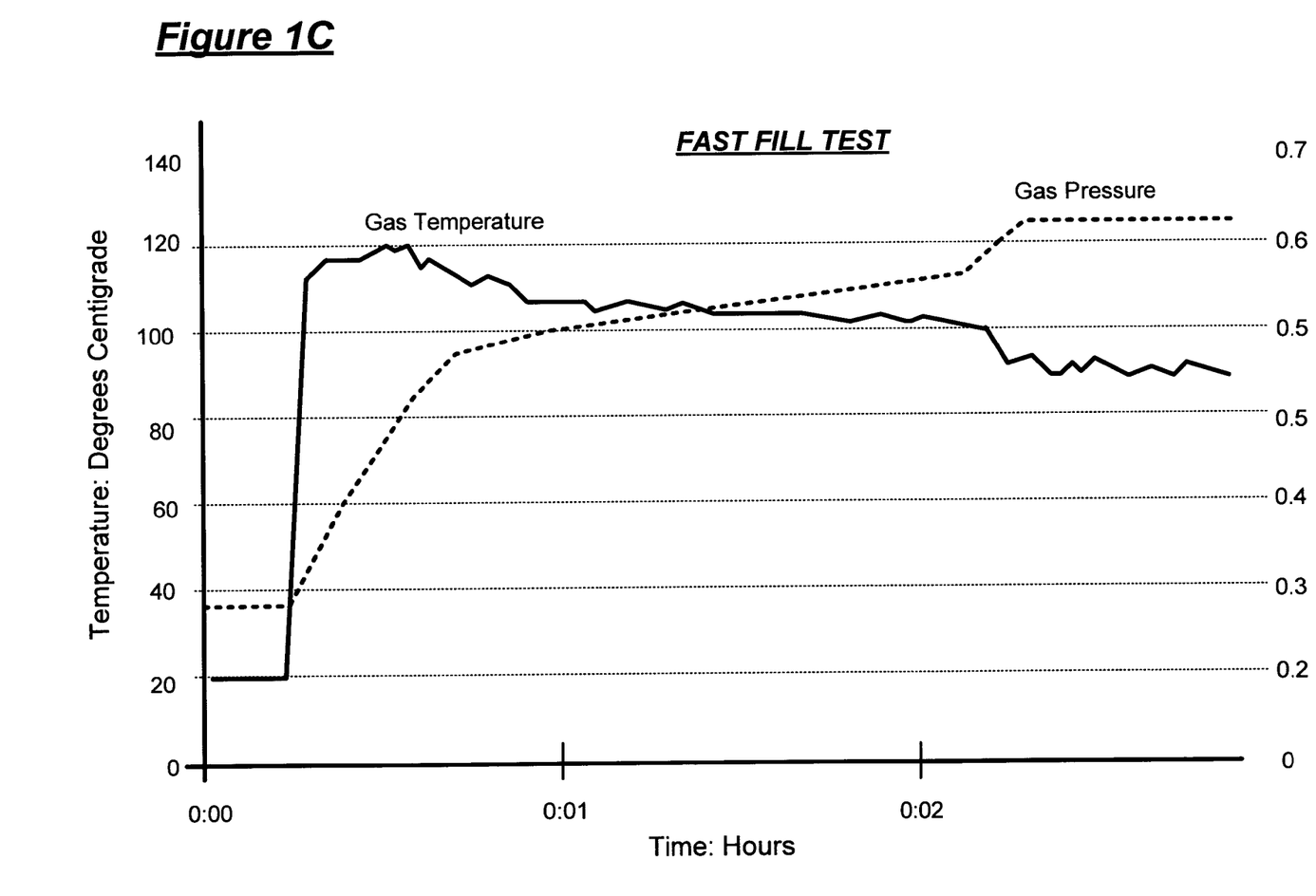
FIG. 1C shows a chart of gas temperature T in centigrade measurement, C°, and gas pressure, P, derived from a fast fill high pressure test.

In FIG. 1B, an on board tank 1 includes an inlet valve V1 with a fuel line check valve 12 in series with refuel line 13 connectable to station refill nozzle 10 allowing the flow of hydrogen 11 into the tank. Fuel consumption line from the tank 14 extends from tank outlet valve V2 through control valve 15 and pressure regulators 16 and 18 to the hydrogen fuel cell stack or CNG powered engine through fuel lines 17 and 19. A chart of gas temperature T [C°] and gas pressure P derived from a fast fill test of a system of FIG. 1B is shown in FIG. 1C.

Typically, high pressure gas vehicle fuel tanks are cylindrical with hemispherical ends and are formed from reinforced fiber composite material (e.g., a carbon fiber exterior winding and an aluminum alloy/plastic interior liner) and, in their various designs, are capable of storing a charge of high pressure gas at an approximately 5000 psi for hydrogen and approximately 3600 psi for CNG, and up to 10,000 psi or more at a maximum rated pressure capacity at a defined temperature. Notwithstanding pressure/temperature capacity, a typical full vehicle tank charge, by an alternative weight fill measurement of hydrogen for a standard vehicle, may be approximately 15 pounds. During refueling, gas in the tank interior is compressed, creating heat figuratively shown by the arrows →, →, etc., in FIG. 2A. Temperature within the vehicle tank increases with higher gas pressure during refill, but as a practical matter, the maximum allowable design temperature in an on board tank may preclude a full refill if temperature constraints are exceeded. In contrast, the system of the invention evacuates the heat of refueling compression by providing the cooling systems described below that utilize the intrinsic mechanical high pressure refilling energy of the gas to power a system for the removal of the heat build up in the vehicle tank system. The term "tank" is equally applicable to a single storage unit, and as is more likely the case, multiple tanks—as multiple tanks are preferred in vehicle design. The cooling coil circulation system is light in weight (compared to other means such as a thermally conductive liner), has a small dead volume in the tank, and is low in cost. The invention utilizes a preexisting energy source intrinsic in the mechanical energy of the high pressure gas being refilled—resulting in a considerable cooling heat flow arising from absorption within the vehicle tank to the radiation of the heat in a device external to the tank.

Figure 2A:
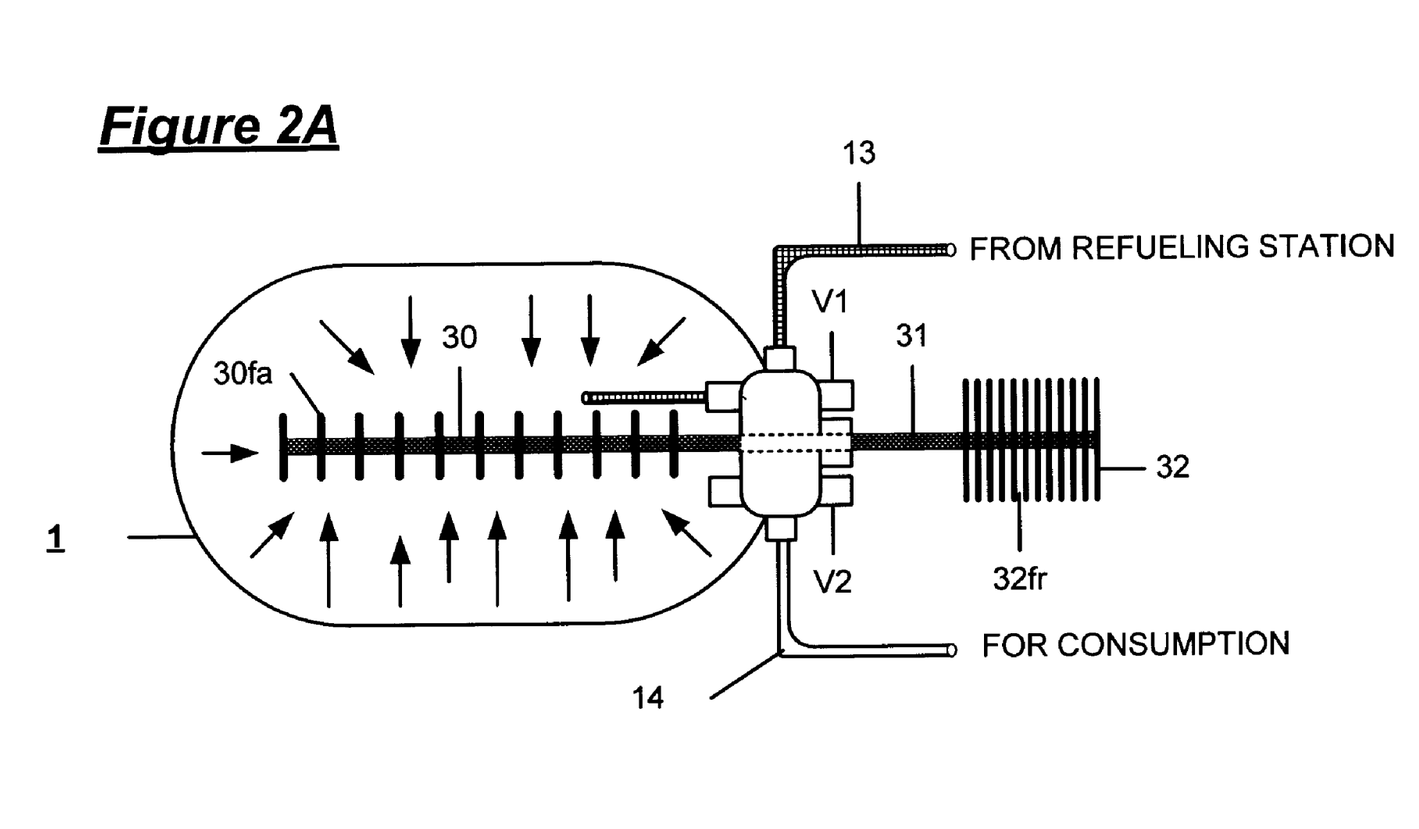
FIG. 2A shows an example of a cooling system using a heat absorber in the tank interior interconnected by a heat pipe to a complimentary external radiator illustrating the principle of the invention.

FIG. 2A illustrates a motor vehicle high pressure storage tank. The tank is formed of a carbon fiber composite as described above and includes a heat sink 30 having a plurality of fins 30$fa$ formed from aluminum, copper or other heat absorbent material, or an alloy, which captures the compression heat of refueling indicated by the arrows → which in turn is transmitted through conduit 31 (a temperature conductive heat pipe or other thermally conductive media) to an external radiator 32 having a plurality of radiating fins 32$fr$, or other heat radiator mechanism. [When the refill pressure is 5000 psi, pre-cooling at the fuel depot is unnecessary because a tank liner may be used effectively to absorb excessive heat; however, metal liner tanks are expensive and heavy and are inadequate to handle the heat load associated with pressures above 5000 psi and particularly, a refill in the range of about 10,000 psi or more.

In FIG. 4, a gas power turbine 90 is interposed between the high pressure gas refueling station and the low pressure vehicle tank in the refueling line. A coolant circulating conduit 40 (shown by way of example as forming a coil within the tank 1) directs a heat absorbent media therein, such as water, Freon, glycol compositions, automotive coolants, and the like, to circulate in a cycle from within the tank interior 45 to external radiator 42 powered by pump mechanism 41. The coil 45 within the tank interior includes a plurality of circumferentially disposed heat absorbent fins 40$fa$. The conduit 40 exits the tank wherein the circulating fluid is introduced to an external heat sink or radiator 42 shown in FIG. 4 as including a plurality of radiating fins 42$fr$. A mesh radiator, a water chamber, the vehicle frame or body or any other like mechanism capable of releasing, dispersing or absorbing the absorbed heat from the gas in the tank may be substituted for or used in addition to radiator 42. In the preferred system of the invention, turbine 90, through the mechanical energy of the gas pressure from the refill depot, powers pump 41. The pump may be powered by a direct connection to the turbine shown in FIG. 2B at 91, or by an indirect interconnection wherein turbine 90 powers electrical generator 95 by a mechanically operative interconnection 92$a$ by which the pump 41 is powered electrically by the current of the generator as shown in the interconnection 92$b$. A fan or blower 43 may similarly be powered by turbine 90, directly through a mechanical interconnection shown at 93$a$ or indirectly through the electrical interconnection shown at 93$b$. Self evidently, either or both of a fan or pump system powered by the turbine may be utilized in the invention.

Figure 2B:
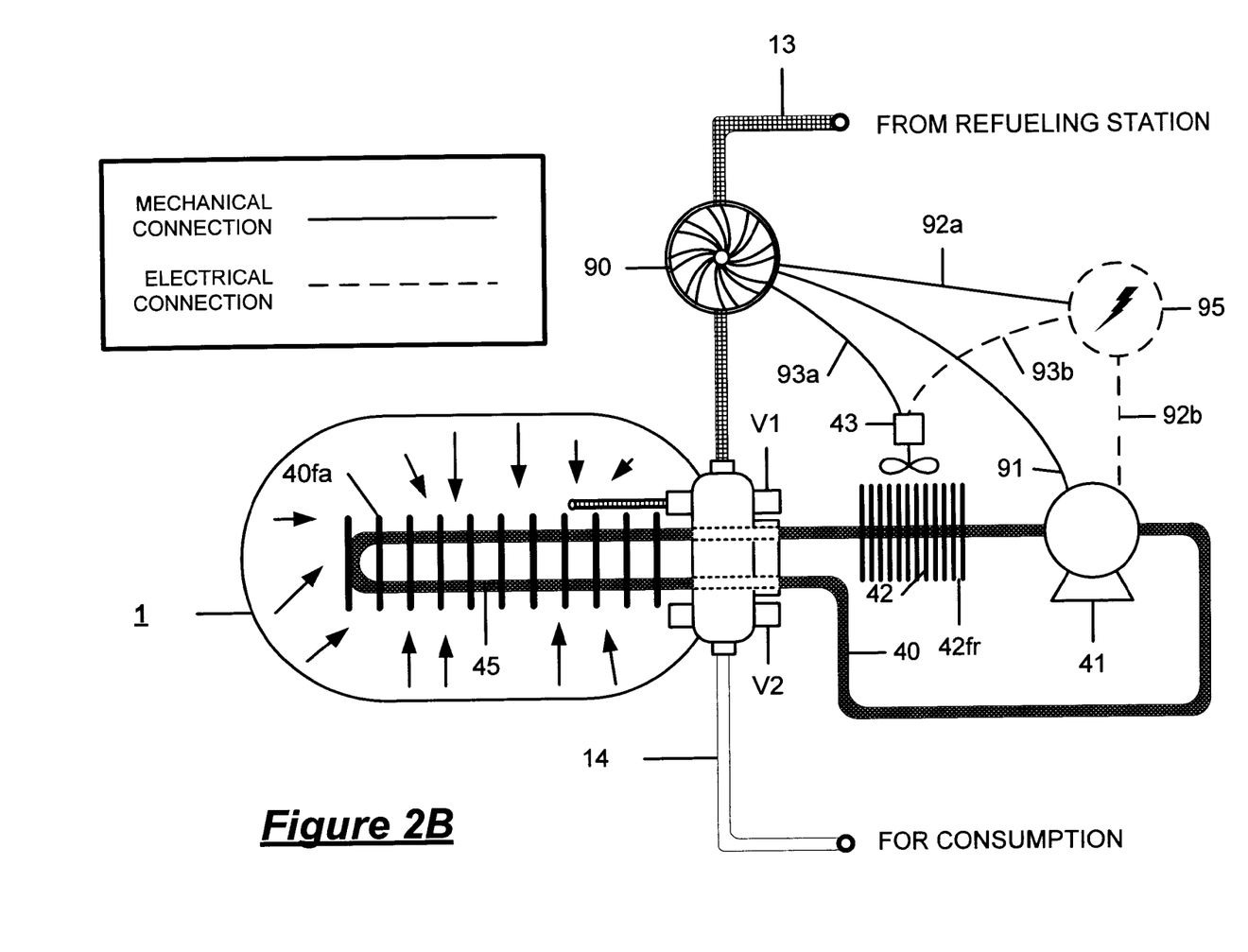
FIG. 2B depicts an embodiment of the invention wherein the mechanical energy of the refilling fluid flow of the high pressure gas from the refueling depot is directed through an in line turbine to provide power to a coolant circulating pump, a radiator cooling blower, or both.
Figure 3:
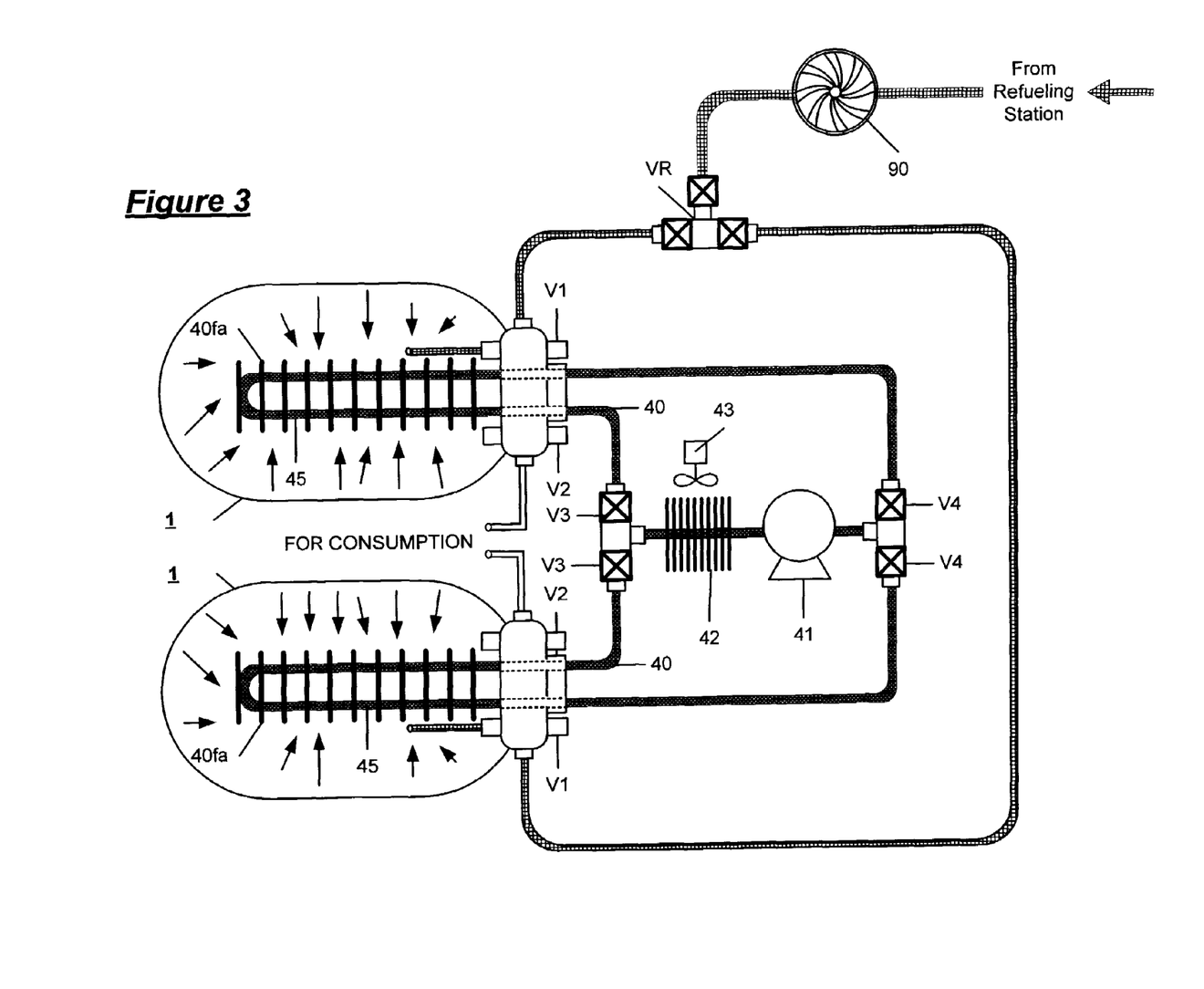
FIG. 3 shows an example of an assembly of two tanks (as the system is adaptable to multiple tanks) interconnected with the refuel gas powered means connected to a common radiator. With evident variation, the multiple tank/radiator assembly shown as an example is adaptable to varied multiples of tanks and tank filling sequences.

FIG. 3 shows a switchable arrangement of a set of two vehicle tanks wherein coolant circuit control valves V3 and V4 associated as a pair with each tank of the two tanks may be switched along with tank inlet valves V1 on each tank to control whether coolant flows simultaneously in the circuits associated with both tanks when a refill is done in parallel, or whether each tank's cooling circuit and refill status is separately conducted in a one after another series refill of the tanks. In FIG. 3, the interposition of turbine 90 in the refuel line is shown wherein power is provided to pump 41 and/or fan or blower 43. For the individual tanks 1 and 1 shown in FIG. 3, the cooling circuits correspond to that shown in tank 1 in FIG. 2B. Refill valve VR is selectable to allow a tank to be filled singly, or to allow both tanks to be refilled in parallel. The appropriate switching configurations and sequences are within the skill of the art. For clarity, the possible mechanical interconnections of the turbine 90 and a generator (not shown) and the pump 41 and/or blower 43 (namely 92$a$, 92$b$, 93$a$ and 93$b$) are omitted.

Figure 4A:
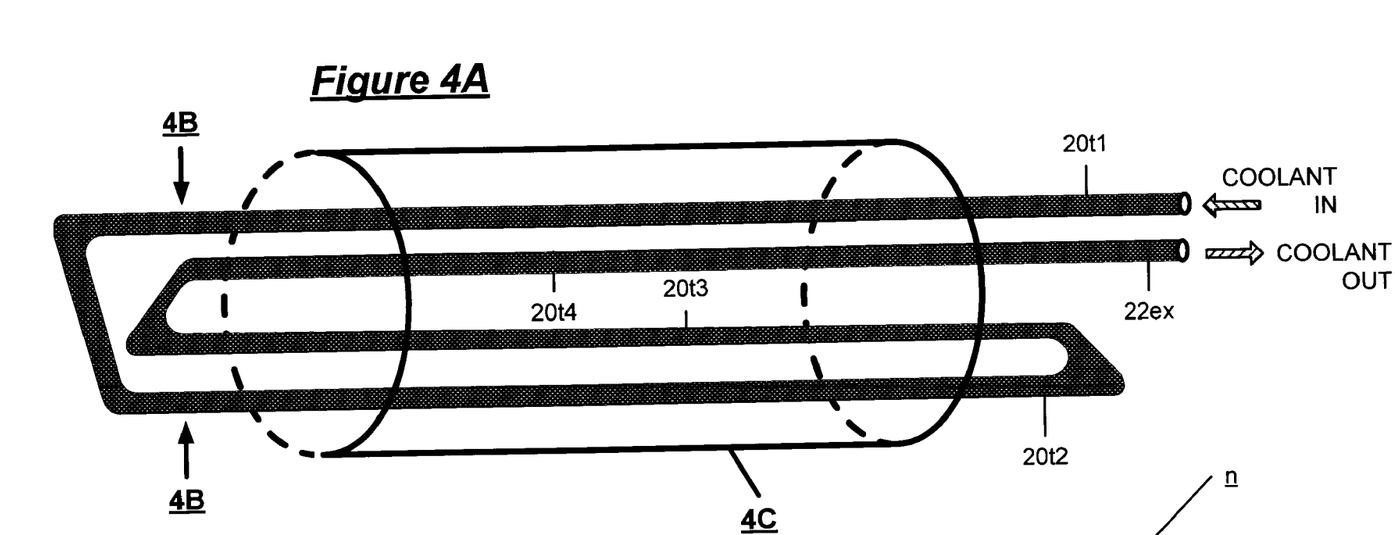
FIG. 4A is a schematic drawing in perspective of an example of the refill tubing circuit, within which the refueling gas circulates within the tank. The coolant tubing, in and out, is encompassed by cooling fins shown in FIG. C, otherwise occupying the volume shown by the cylinder shape depicted in FIG.4A. 4B→←4B indicates the tubing turn sections where one turned section overlaps the other in the reverse turns of the coolant tubing at one end of the circuit.
Figure 4B:
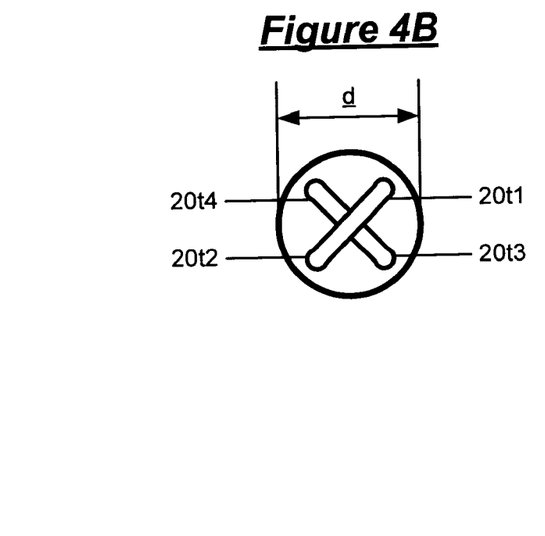
FIG. 4B is a plan view of the end of the end of the tubing circuit showing the overlapping tubing sections as the tubing sections reverse in direction and exit from and reenter the cooling fins within the apparatus.
Figure 4C:
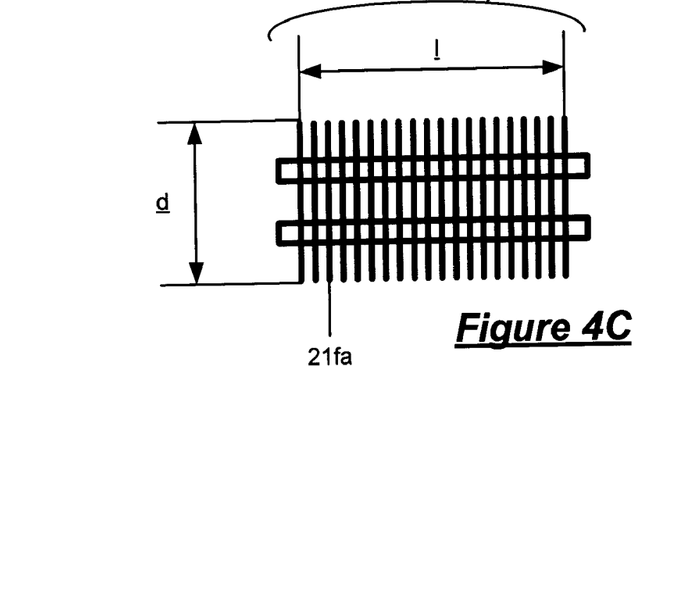
FIG. 4C is a side view of the tubing/fin structure showing the disposition of the tubing sections extending through and within a plurality of cooling fins. The dimensions shown in FIG. 4C define parameters showing a volume, wherein d=diameter of fins; l=length of fins; n=number of fins, useful for calculating internal heat absorbing capacity for a series of auxiliary fins or other means utilized for heat absorption.

FIG. 4A depicts a volume of a plurality of a number of circular fins surrounding an internal tank coolant coil leading from inlet 20$t1$ to conduit 20$t2$ to conduit 20$t3$ to conduit 20$t4$ to coolant exit 20$ex$. The space within the tank occupied by the cylinder of absorbent fins is the volume defined by the cylinder shown as FIG. 4C. Each internal fin (21$fa$ in FIG. 4C) in the heat absorbent assembly 4C has the diameter d shown in FIG. 4B; the finned heat absorbent assembly has the length l shown in FIG. 4C. With a given number of fins n having a known thickness and diameter and a heat absorbent fin material having a known coefficient of heat absorption, cooling capacity of the internal tank fins can be calculated and factored into an estimation of the overall cooling effectiveness of the system using the heat absorbent coefficient of the circulating fluid and the fluid flow rate, allowing for conduction losses.

Figure 4D:
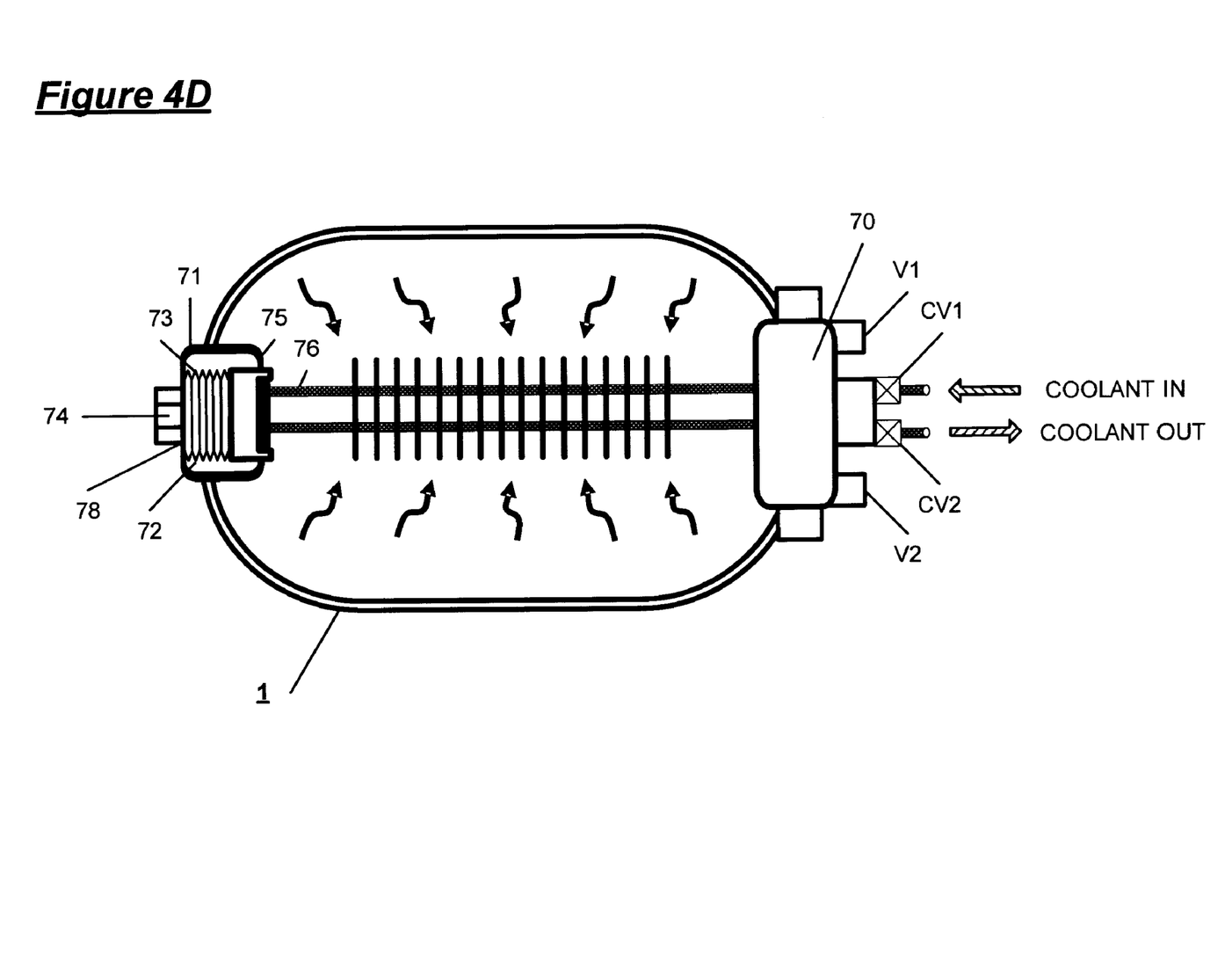
FIG. 4D shows, inter alia, an example of an end cap configuration for the tank used to secure the tube circuit coolant circulating system within the tank.

FIG. 4D shows a configuration of heat absorber and interior tank assembly for a tank 1 of the invention having end cap apparatus 70 and 71 at each opposite end of the fuel tank. Cap 71, at the end of the tank opposite the inlet/outlet side, includes inside threads 72 cooperative with exterior threads 73 and locking nut 74 on a screw in fixture 78 to maintain the circulation coil or pipe 76 assembly in a fixed position within the tank by receiver 75. On the inlet/outlet side of the tank 70, the coolant assembly is secured by means similar to that used at end cap 70. Gas inlet valve V1 and gas outlet valve V2 are shown at the cap. Valves CV1 and CV2 may control circulation of the coolant during refueling and vehicle operation through a vehicle control system in accordance with the principles of the invention set out herein.

As noted, the system is adaptable to multiple tanks and a vehicle control system providing selectable or controllable inlet valves and selectable or controllable outlet valves for the tanks and the coolant system operatively interconnected with a control means, logic circuit, or CPU on the vehicle. The vehicle control system also monitors pressure and/or temperature or other sensing means associated with the tanks or their inlet and outlet lines, the cooling fluid circulation lines, and the fluid pump and/or and may be adapted to control vehicle operation accordingly. Specific control configurations and parameters, and sensors, valve locations and systems in accordance with the principles of the invention are preferably based on overall vehicle design considerations. For example, pressure, temperature and other sensors and controls may be provided to monitor tank and/or line pressures and temperatures, to start, stop and adjust coolant fluid flow, fan speed and duration, and other parameters associated with a proper operating protocol of the vehicle tank or valve system for refilling and consumption of pressurized fuel in the course of vehicle operation. An example of a vehicle control system useful with a multiple tank assembly is included in co-pending application Ser. No. 11/001,881, "Hydrogen Vehicle Gas Utilization and Refueling System" filed on Dec. 2, 2004 in the United States Patent Office, and assigned to the same assignee as is the present application hereof.

Figures 5A, 5B, 5C, 5D:
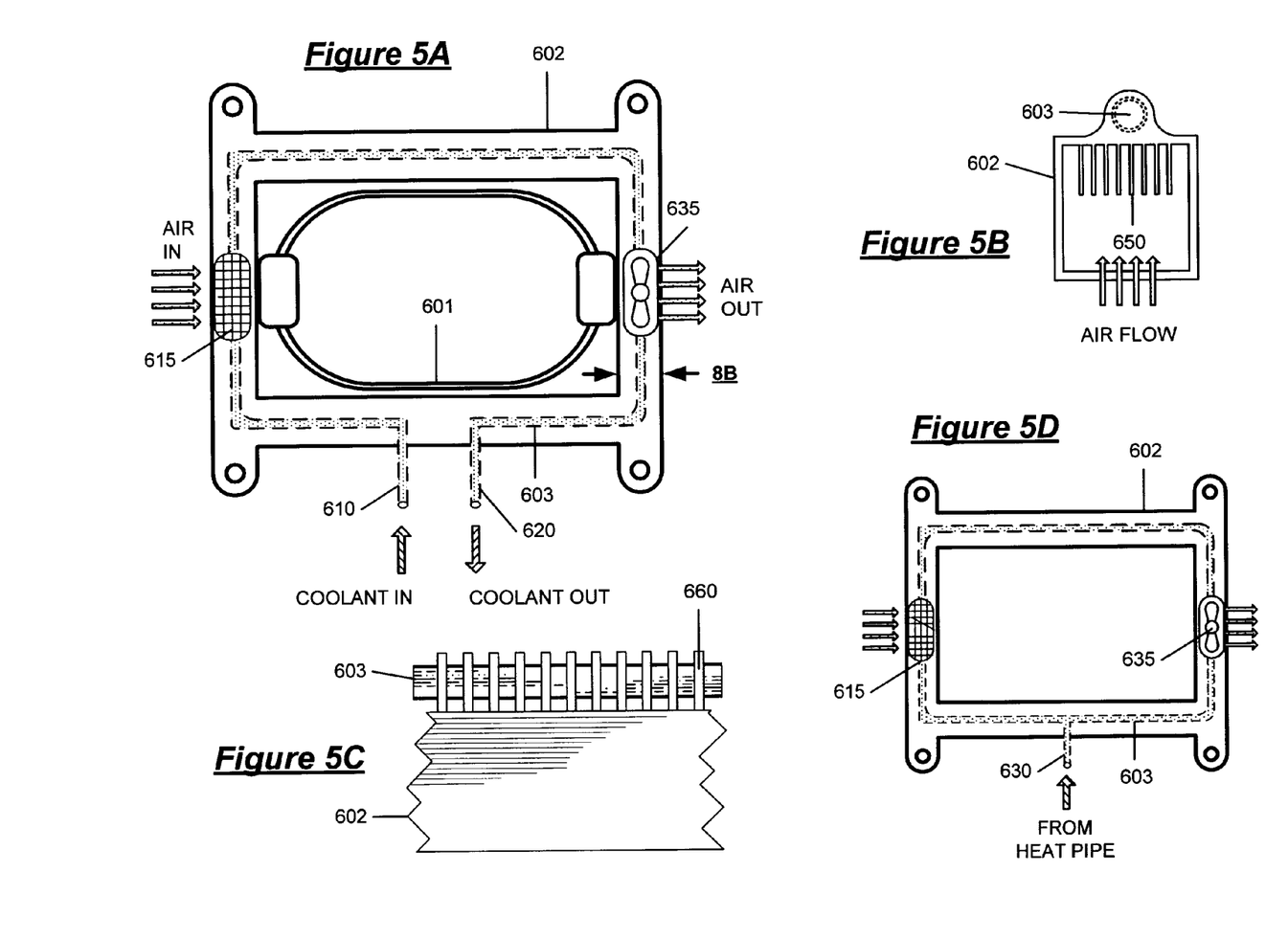
FIG. 5A shows a circulating fluid cooling line circuit disposed within a vehicle frame component for circulating a cooling medium.
FIG. 5B, FIG. 5C, FIG. 5D, FIG. 5E, and FIG. 5F show examples of cooling fin radiator configurations disposed within and on a vehicle frame assembly or fuel tank sub assembly.

With reference to the embodiments discussed as examples, the heat radiating means shown in the radiator embodiments, 32 in FIGS. 2A and 45 in FIG. 2B and FIG. 3, may be supplemented or replaced by the vehicle sub frame cooling systems shown in FIG. 5A, FIG. 5B, FIG. 5C, FIG. 5D, FIG. 5E and FIG. 5F. FIG. 5A shows a circulating fluid cooling line circuit 603 disposed within a vehicle frame component 602 surrounding tank 601 for circulating a cooling medium about the tank sub frame. Frame cooling media, which will typically be air, is received in frame inlet 615 and exhausted through an outlet which may include a fan 635 or other active means for removing heat from the cooling media in line 603 that circulates within the tank cooling circuit. In a closed cooling circuit, fluid such as air, water, Freon, other coolants referred to herein, etc., flows within a continuous circuit from the fuel tank coil circulating system (e.g., such as shown in FIG. 4A, FIG. 4B, FIG. 4C and FIG. 4D) inlet and outlet wherein "Coolant Out" from the tank (See FIG. 4D) is matched with "Coolant In" 610 shown in FIG. 5A. "Coolant Out" from the frame radiator 620 is matched with "Coolant In" shown in FIG. 4D and the coolant media returns to the tank coil circuit. (Except for identifying flow direction "in" and "out" designate the end connections of the coolant circuit where the internal tank coils are connected to the radiator.) The heat from coolant media line 603 is radiated externally by air circulating in the frame driven by fan 635.

Figures 5E, 5F:
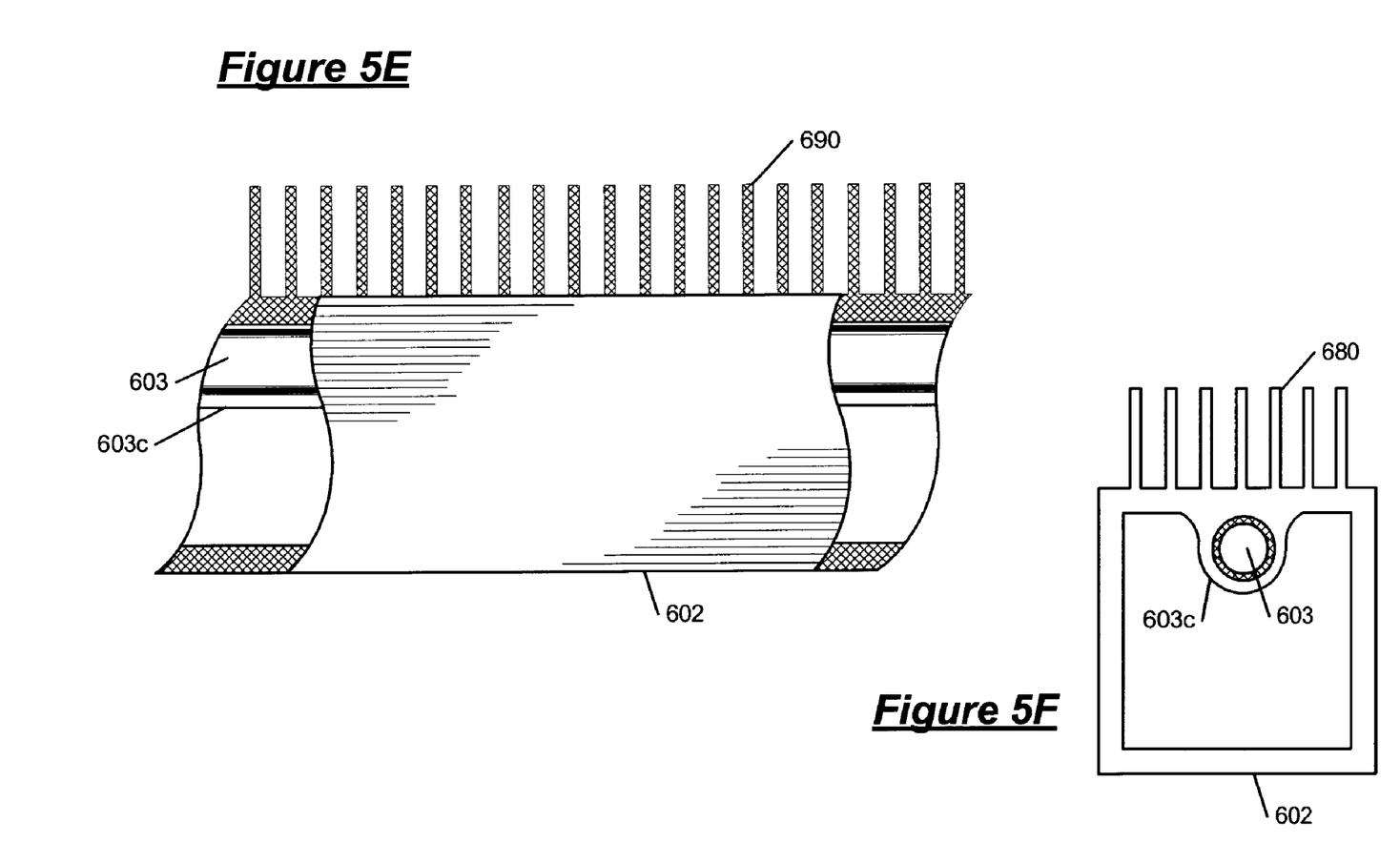

In the case of the system shown in FIG. 5D used as an example with passive examples shown in FIG. 2A, the subframe inlet 630 receives heat from the heat pipe 31 connected to fin absorber 30 (FIG. 2A). In FIG. 5D, A supply of air is introduced at 615 and exits at 635 and evacuates the heat introduced into the frame system from the heat pipe leading from the tank interior. FIG. 5B and FIG. 5C respectively show examples of a tube circuit tube 603 mounted upon the sub frame assembly, with internal sub frame fins 650 (FIG. 5B) and external fins 660 (FIG. 5C). Air circulation within the frame channel and air introduction in the variation of FIG. 5B may be the same as shown in FIG. 5A, namely, air enters through inlet 615 flows through sub frame cavity 602 to outlet or fan 635. The circulating coolant circuit tube 603 may be formed as an extruded or molded interior conduit; however, it is preferable, whether the tube is within, upon, or otherwise a component of the sub frame assembly, that the coolant media circulation tube be a separate tube inserted within the frame assembly formed from a high conductivity high strength material such as a stainless steel alloy SUS, copper or aluminum. FIG. 5E and FIG. 5F show an example wherein the coolant circulation pipe 603 is installed within a cavity 603a in the frame 602 interior and radiator fins are transverse to the frame, FIG. 5E and parallel to the frame, FIG. 5F.

The fluid flow of the high pressure gas may be directed through an in line turbine to provide power to the coolant circulating pump or a blower or fan means either through a direct mechanical link or through, for example, an alternate electric generator means mechanically linked to the turbine. The turbine may power a generator that in turn provides electric power to a circulating pump or fan that is electrically powered. The use of a turbine to provide electric power allows on demand control of the pump flow of the coolant fluid through the circuit and also provides a temporary alternate on board source of electric power. In the electric version, power to pump or fan is not limited to the time during which high pressure refill occurs; the pump may be powered otherwise by alternate sources. Likewise, a mechanical interconnection may be configured to provide on demand power.

In all instances described herein, it is assumed that during the state of refueling, the outlet valves for each tank are closed; and during the instance of consumption, the inlet valves for each tank are closed and the cooling fluid correspondingly circulated in a manner typically monitored and controlled by a vehicle operation system.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. Apparatus for circulating cooling media in a tank on a vehicle having an on board tank for the storage of a fuel gas wherein the tank is refueled under high pressure through a fuel line at a refueling depot, comprising: 1) a fluid heat absorbent media that circulates in a conduit within the tank and absorbs the heat of compression resulting from the refueling of the on board tank, 2) a conduit circuit within which the media circulates and an interconnection of the conduit to a radiator external to the tank where the heat absorbed by the media is exhausted to an environment external to the tank, and 3) a turbine interposed in the fuel line between the high pressure gas depot and the on board tank to capture the mechanical energy of gas flow within the fuel line to power the circulation of the media within the conduit.

2. The apparatus of claim 1 wherein the turbine is mechanically connected to the conduit in the system.

3. The apparatus of claim 1 including an auxiliary blower for cooling the media.

4. The apparatus of claim 3 wherein the blower is mechanically connected to the turbine.

5. The apparatus of claim 1 wherein the turbine is mechanically connected to an electrical generator.

6. The apparatus of claim 5 wherein the electrical generator powers a pump to circulate the media within the conduit and a blower disposed to cool the media.

7. The apparatus of claim 1 including a heat pipe interconnecting a heat absorber within the tank to the radiator external to the tank.

8. Apparatus in accordance with claim 1 wherein the heat absorbent media circulating within the conduit circulates in a closed loop.

9. Apparatus in accordance with claim 8 including a plurality of heat absorber fins circumferentially encompassing a conduit loop in a fluid circulation circuit for the media within the tank, wherein heat absorbed by the media is transferred to the fluid circulating in the conduit to an external radiator where the heat is disposed of and the fluid is thereafter recirculated to the tank interior.

10. Apparatus in accordance with claim 1 wherein the radiator comprises 1) heat disposing elements configured on a vehicle frame assembly and 2) a fluid circulation loop within the vehicle frame assembly proximate the heat disposing elements.

11. Apparatus in accordance with claim 1 or claim 2 or claim 3 or claim 4 or claim 5 or claim 6 or claim 7 or claim 8 or claim 9 or claim 10 including a plurality of on board tanks wherein at least one tank includes 1) a heat absorbent media that circulates in a conduit within the tank and absorbs the heat of compression resulting from the refueling of the on board tank, 2) an interconnection of the conduit to a radiator external to the tank where the heat absorbed is exhausted to an environment external to the tank, and 3) a turbine interposed in the fuel line between the high pressure gas depot and the on board tank to capture the mechanical energy of the gas flow within the fuel line to rower the circulation of the media within the conduit.

12. Apparatus in accord with claim 11 wherein the filling sequence for the plurality of tanks is that all tanks are filled in parallel simultaneously.

13. The apparatus of claim 5 wherein the electrical generator powers a pump to circulate the media within the conduit.

14. The apparatus of claim 5 wherein the electrical generator powers a blower for cooling the media.

15. Apparatus in accord with claim 11 wherein the filling sequence for the plurality of tanks is that all tanks are filled separately in a series order one at a time.

16. Apparatus for cooling fuel gas in a tank on vehicle having an on board tank for the storage of a fuel gas wherein the tank is refueled under high pressure through a fuel line between a depot tank and an on board tank at a refueling depot comprising 1) a heat absorber within the tank, 2) a heat pipe extending from within the tank to a radiator external to the tank, the heat pipe operatively interconnecting with the heat absorber such that the heat pipe conducts heat absorbed by the external radiator, and 3) a turbine interposed in the fuel line between the refueling depot and the on board tank, the turbine capturing the mechanical energy of gas flow within the fuel line to power a cooling system operatively disposed with respect to the radiator external to the tank such that the absorbed heat is dissipated.

17. Apparatus in accordance with claim 16 including a plurality of heat absorbent fins circumferentially surrounding the heat pipe.

18. Apparatus in accordance with claim 10 wherein the heat disposing elements configured on a vehicle frame assembly include a plurality of heat disposing fins.

* * * * *